United States Patent
Zeng et al.

(10) Patent No.: US 12,386,681 B2
(45) Date of Patent: Aug. 12, 2025

(54) DATA STREAM ARCHITECTURE-BASED ACCELERATOR, AND DATA ACCESS METHOD AND DEVICE FOR ACCELERATOR

(71) Applicant: Shenzhen Corerain Technologies Co., Ltd., Guangdong (CN)

(72) Inventors: Chenglong Zeng, Guangdong (CN); Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 500 days.

(21) Appl. No.: 18/146,456

(22) Filed: Dec. 26, 2022

(65) Prior Publication Data
US 2023/0205607 A1 Jun. 29, 2023

(30) Foreign Application Priority Data
Dec. 29, 2021 (CN) .......................... 202111642091.5

(51) Int. Cl.
*G06F 9/52* (2006.01)
*G06F 12/02* (2006.01)

(52) U.S. Cl.
CPC ............ *G06F 9/52* (2013.01); *G06F 12/0223* (2013.01); *G06F 2212/1028* (2013.01)

(58) Field of Classification Search
None
See application file for complete search history.

(56) References Cited

U.S. PATENT DOCUMENTS

| 11,348,624 B1 * | 5/2022 | Walke ................. G11C 7/1006 |
| 2020/0356367 A1 * | 11/2020 | Van Lunteren ....... G06F 9/3824 |
| 2021/0311874 A1 * | 10/2021 | Ozcan ................. G06F 12/0246 |

FOREIGN PATENT DOCUMENTS

| CN | 106445678 A | 2/2017 |
| CN | 111860821 A | 10/2020 |
| CN | 113592088 A | 11/2021 |

\* cited by examiner

Primary Examiner — Craig C Dorais

(57) ABSTRACT

A data stream architecture-based accelerator includes a storage unit, a read-write address generation unit and a computing unit. The storage unit includes a plurality of banks. The read-write address generation unit is used for generating storage unit read-write addresses according to a preset read-write parallelism, determining target banks in the storage unit according to the storage unit read-write addresses and reading to-be-processed data from the target banks for operations in the computing unit. The computing unit includes a plurality of data paths and is configured to determine target data paths according to a preset computing parallelism so that the target data paths can perform operations on the to-be-processed data to obtain processed data, and then store the processed data into the target banks according to the storage unit read-write addresses.

10 Claims, 2 Drawing Sheets

DATA STREAM ARCHITECTURE-BASED ACCELERATOR, AND DATA ACCESS METHOD AND DEVICE FOR ACCELERATOR

CROSS REFERENCE TO RELATED APPLICATIONS

The present application claims the benefit of Chinese Patent Application No. 202111642091.5 filed on Dec. 29, 2021, the contents of which are incorporated herein by reference in their entirety.

TECHNICAL FIELD

The embodiment of the present disclosure relates to the technical field of data processing, and more particularly relates to a data stream architecture-based accelerator, and a data access method and device for the accelerator.

BACKGROUND

Studies in recent years show that compared with conventional feature extraction algorithms, neural network algorithms have big advantages in the field of computer vision. Neural networks are widely applied in the fields of image, audio and video recognition, etc., but are difficult to apply due to computing and storage complexity of the neural network algorithms. Since a Central Processing Unit (CPU) platform difficultly provides enough computing capability, a Graphics Processing Unit (GPU) platform becomes a preferred platform for neural network processing, which is high in operational capability and has a simple and easy-to-use development framework. However, when processing the neural networks, the GPU has a low utilization rate for computing resources, which causes that a computing unit is in an idle state within most of the time. To increase the utilization rate for the computing resources, a data stream architecture-based accelerator is provided, and in the architecture, data transmission and computation may be parallel, and different computing units may realize parallel execution.

To obtain higher computing capability, the data stream architecture-based accelerator needs to increase a fetch and computation parallelism. The parallelism of a fetch and computation is fixed in a conventional data stream architecture-based accelerator. When data are not aligned to the fixed parallelism, filling of a few zeros is needed to align the data to the fixed parallelism. After zero filling, a to-be-transmitted data volume will be increased, thereby increasing a data transmission bandwidth and prolonging data transmission time and data storage time, and in addition, power consumption of the whole accelerator is increased due to storage and computation for filled zero.

SUMMARY

The embodiment of the present disclosure provides a data stream architecture-based accelerator, and a data access method and device for the accelerator so as to reduce accelerator bandwidth requirements and data storage requirements, shorten run time and reduce power consumption.

In the first aspect, the embodiment of the present disclosure provides a data stream architecture-based accelerator, including: a storage unit, a read-write address generation unit and a computing unit.

The storage unit includes a plurality of banks;

the read-write address generation unit is configured to generate storage unit read-write addresses according to a preset read-write parallelism so as to determine target banks in the storage unit according to the storage unit read-write addresses and read to-be-processed data from the target banks for operations in the computing unit; and the computing unit includes a plurality of data paths and is configured to determine target data paths according to a preset computing parallelism so that the target data paths can perform operations on the to-be-processed data to obtain processed data, and then store the processed data into the target banks according to the storage unit read-write addresses.

Optionally, the number of the banks is an integral multiple of the preset read-write parallelism.

Optionally, the read-write address generation unit is further configured to generate enable signals of the target banks so as to start target bank read-write enable.

Optionally, the computing unit is further configured to generate enable signals of the target data paths so as to start target data path enable.

Optionally, the preset read-write parallelism includes a preset read parallelism and a preset write parallelism;

correspondingly, the storage unit read-write addresses include storage unit read addresses and storage unit write addresses, and the target banks include target read banks and target write banks;

the read-write address generation unit is specifically configured to generate the storage unit read addresses according to the preset read parallelism, generate the storage unit write addresses according to the preset write parallelism, determine the target read banks according to the storage unit read addresses, and read the to-be-processed data from the target read banks for operations in the computing unit; and the computing unit is specifically configured to use the target data paths to perform operations on the to-be-processed data to obtain processed data, and store the processed data into the target write banks according to the storage unit write addresses.

Optionally, the preset read parallelism, the preset write parallelism and the preset computing parallelism may be the same or partially the same or different from one another.

In the second aspect, the embodiment of the present disclosure further provides a data access method for an accelerator. The method is applied to a data stream architecture-based accelerator provided by any embodiment of the present disclosure, including:

determining an optimal read-write parallelism and an optimal computing parallelism according to sizes of to-be-processed data;

configuring a control register of the accelerator according to the optimal read-write parallelism and the optimal computing parallelism, where configuration parameters of the control register include a preset read-write parallelism and a preset computing parallelism;

reading the to-be-processed data from a storage unit according to the configured preset read-write parallelism and outputting the to-be-processed data to a computing unit so that the computing unit can perform operations according to the configured preset computing parallelism; and returning processed data obtained after operations to the storage unit according to the configured preset read-write parallelism.

Optionally, the step of determining an optimal read-write parallelism and an optimal computing parallelism according to sizes of to-be-processed data includes:

traversing all settable read-write parallelisms and computing parallelisms and respectively determining corresponding processing time; and determining a read-write parallelism and a computing parallelism corresponding to the shortest processing time as the optimal read-write parallelism and the optimal computing parallelism correspondingly.

In the third aspect, the embodiment of the present disclosure further provides a computer device, including:

one or more processors; and a memory configured to store one or more programs.

When the one or more programs are executed by the one or more processors, the one or more processors realize a data access method for an accelerator according to any embodiment of the present disclosure.

In the fourth aspect, the embodiment of the present disclosure further provides a computer-readable storage medium storing a computer program. When the computer program is executed by a processor, the data access method for the accelerator according to any embodiment of the present disclosure is implemented.

The embodiment of the present disclosure provides the data stream architecture-based accelerator, including the storage unit, the read-write address generation unit and the computing unit. The storage unit includes the plurality of banks, and the computing unit includes the plurality of data paths. The read-write address generation unit is used for generating the storage unit read-write addresses according to the preset read-write parallelism, determining the target banks for reading the to-be-processed data according to the read-write addresses and reading the to-be-processed data from the target banks into the computing unit. The computing unit determines the target data paths for operations according to the preset computing parallelism, performs operations on the to-be-processed data by the target data paths to obtain the processed data, and finally stores the processed data into the target banks according to the read-write addresses, thereby reducing bandwidth requirements and data storage requirements of the accelerator, shortening run time, and meanwhile reducing power consumption.

DETAILED DESCRIPTION

The following further describes the present disclosure in detail with reference to the accompanying drawings and embodiments. It may be understood that specific embodiments described herein are only used to explain the present disclosure, but not to limit the present disclosure. In addition, it should be further noted that, for ease of description, the accompanying drawings only show parts relevant to the present disclosure rather than the entire structure.

Before exemplary embodiments are discussed in more detail, it needs to be mentioned that some exemplary embodiments are described as processing or methods described by flowcharts. Although the flowcharts describe steps into sequential processing, many of the steps may be implemented in parallel or concurrently or synchronously. In addition, the sequence of the steps may be re-arranged. After operation is finished, the processing may be terminated, but additional steps not included in drawings may be further included. The processing may correspond to the methods, functions, procedures, subroutines, subprograms, etc.

Embodiment 1

Figure 1:
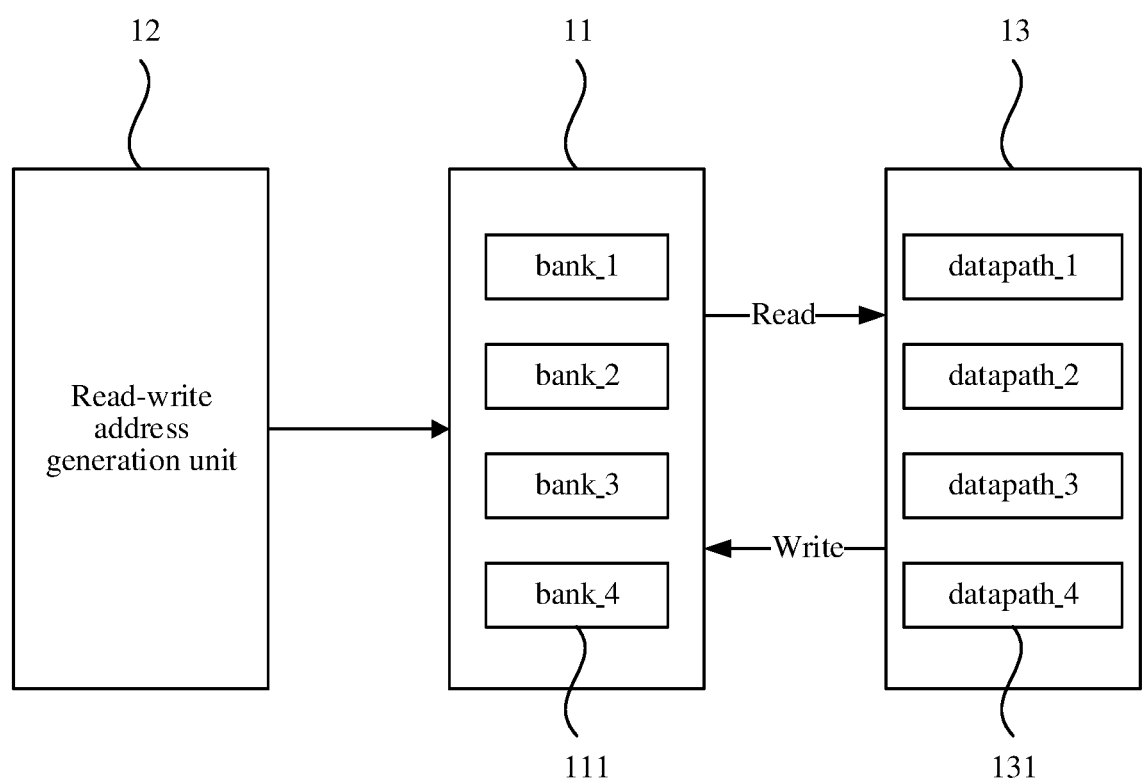
FIG. 1 is a structural schematic diagram of a data stream architecture-based accelerator according to Embodiment 1 of the present disclosure.

FIG. 1 is a structural schematic diagram of a data stream architecture-based accelerator according to Embodiment 1 of the present disclosure. The embodiment is applicable to increasing a computing resource utilization rate when a GPU processes neural networks. As shown in FIG. 1, the accelerator includes: a storage unit 11, a read-write address generation unit 12 and a computing unit 13, where, the storage unit 11 includes a plurality of banks 111 (FIG. 1 exemplarily illustrates four banks: bank_1, bank_2, bank_3 and bank_4 which are not limited in the embodiment); the read-write address generation unit 12 is configured to generate storage unit read-write addresses according to a preset read-write parallelism so as to determine target banks in the storage unit 11 according to the storage unit read-write addresses and read to-be-processed data from the target banks for operations in the computing unit 13; and the computing unit 13 includes a plurality of data paths 131 (FIG. 1 exemplarily illustrates four data paths: datapath_1, datapath_2, datapath_3 and datapath_4 which are not limited in the four data paths of the embodiment) and is configured to determine target data paths according to a preset computing parallelism so that the target data paths can perform operations on the to-be-processed data to obtain processed data, and then store the processed data into the target banks according to the storage unit read-write addresses.

Specifically, the storage unit 11 is configured to store the to-be-processed data and the processed data and the storage unit 11 may be divided into n banks to realize configurable parallelism read data, where n may be a positive integer greater than 1. The read-write address generation unit 12 may generate different storage unit read-write addresses according to different preset read-write parallelisms so as to determine the target banks practically used for reading data in the storage unit 11, thereby reading the to-be-processed data from the target banks for the operations in the computing unit 13. Exemplarily, during data reading, assuming that the storage unit 11 includes 16 banks (bank_1-bank_16) and a preset read-write parallelism is 4, when a storage unit read-write address generated by the read-write address generation unit 12 is 0, bank_1-bank_4 are determined as target banks, and accordingly, data are fetched from bank_1-bank_4 to the computing unit 13. The computing unit 13 is configured to perform operations on the to-be-processed data to obtain processed data. To realize configurable parallelism computation, the computing unit 13 may be divided into m data paths, where m may be a positive integer greater than 1. The computing unit 13 may determine target data paths practically used for operations in the computing unit 13 according to the preset computing parallelism, and after the to-be-processed data fetched from the target banks are acquired, the target data paths can be used for performing operations on the to-be-processed data. Exemplarily, during parallel computation on the data, assuming that the computing unit 13 includes eight data paths (datapath_1-datapath_8) and the preset computing parallelism is 4, datapath_1-datapath_4 may be determined as target data paths so as to perform operations on the to-be-processed data, and then the processed data are stored in the target banks according to the above determined storage unit read-write addresses. The preset read-write parallelism and the preset computing parallelism are flexible and variable instead of being constant, and in other words, the provided accelerator may be applicable to various parallelisms. In addition, to prevent bank conflicts, if a plurality of to-be-read data are stored in one bank and cannot be fetched within one cycle, optionally, the number of the banks is an integral multiple of the preset read-write parallelism, and namely, it needs to be guaranteed that the number of the banks can be subjected to exact division by the preset read-write parallelism.

Optionally, the preset read-write parallelism includes a preset read parallelism and a preset write parallelism. Correspondingly, the storage unit read-write addresses include storage unit read addresses and storage unit write addresses. The target banks include target read banks and target write banks. The read-write address generation unit 12 is specifically configured to generate the storage unit read addresses according to the preset read parallelism, generate the storage unit write addresses according to the preset write parallelism, determine the target read banks according to the storage unit read addresses, and read the to-be-processed data from the target read banks for operations in the computing unit 13. The computing unit 13 is specifically configured to use the target data paths to perform operations on the to-be-processed data to obtain processed data, and store the processed data into the target write banks according to the storage unit write addresses. Specifically, data read-write processes may be respectively performed, and the storage unit read addresses and the storage unit write addresses are generated according to the preset read parallelism and the preset write parallelism, thereby respectively determining the target read banks and the target write banks. The computing unit 13 may acquire the to-be-processed data from the target read banks for operations and store the processed data obtained after operations into the target write banks.

Furthermore, optionally, the preset read parallelism, the preset write parallelism and the preset computing parallelism may be the same or partially the same or different from one another. Specifically, the to-be-processed data read from one target read bank may be used by one or more target data paths, the processed data obtained after operations via the plurality of target data paths may also be stored in one or more target read banks, namely, the number of the adopted target data paths may be consistent to or inconsistent to the number of the target read banks and the target write banks, and accordingly, the preset read parallelism, the preset write parallelism and the preset computing parallelism may be the same or partially the same or different from one another.

On the basis of the above technical scheme, optionally, the read-write address generation unit 12 is further configured to generate enable signals of the target banks so as to start target bank read-write enable. Optionally, the computing unit 13 is further configured to generate enable signals of the target data paths so as to start target data path enable. Specifically, the read-write address generation unit 12 may further generate enable signals of the target banks so as to start target bank read-write enable while not starting read-write enable of other banks in the storage unit 11, thereby further reducing power consumption. Similarly, the computing unit 13 may further generate enable signals of the target data paths so as to start target data path enable while not starting enable of other data paths in the computing unit 13, thereby further reducing power consumption. According to the above examples, during data reading, read enable of bank_1-bank_4 may be started while read enable of bank_5-bank_16 is not started; and during parallel computation, enable of datapath_1-datapath_4 may be started while enable of datapath_5-datapath_8 may be closed.

The data stream architecture-based accelerator according to the embodiment of the present disclosure includes the storage unit, the read-write address generation unit and the computing unit, where, the storage unit includes the plurality of banks, and the computing unit includes the plurality of data paths. The read-write address generation unit is used for generating the storage unit read-write addresses according to the preset read-write parallelism, determining the target banks for reading the to-be-processed data according to the read-write addresses and reading the to-be-processed data from the target banks into the computing unit. The computing unit determines the target data paths for operations according to the preset computing parallelism, performs operations on the to-be-processed data by the target data paths to obtain the processed data, and finally stores the processed data into the target banks according to the read-write addresses, thereby reducing bandwidth requirements and data storage requirements of the accelerator, shortening run time, and meanwhile reducing power consumption.

Embodiment 2

Figure 2:
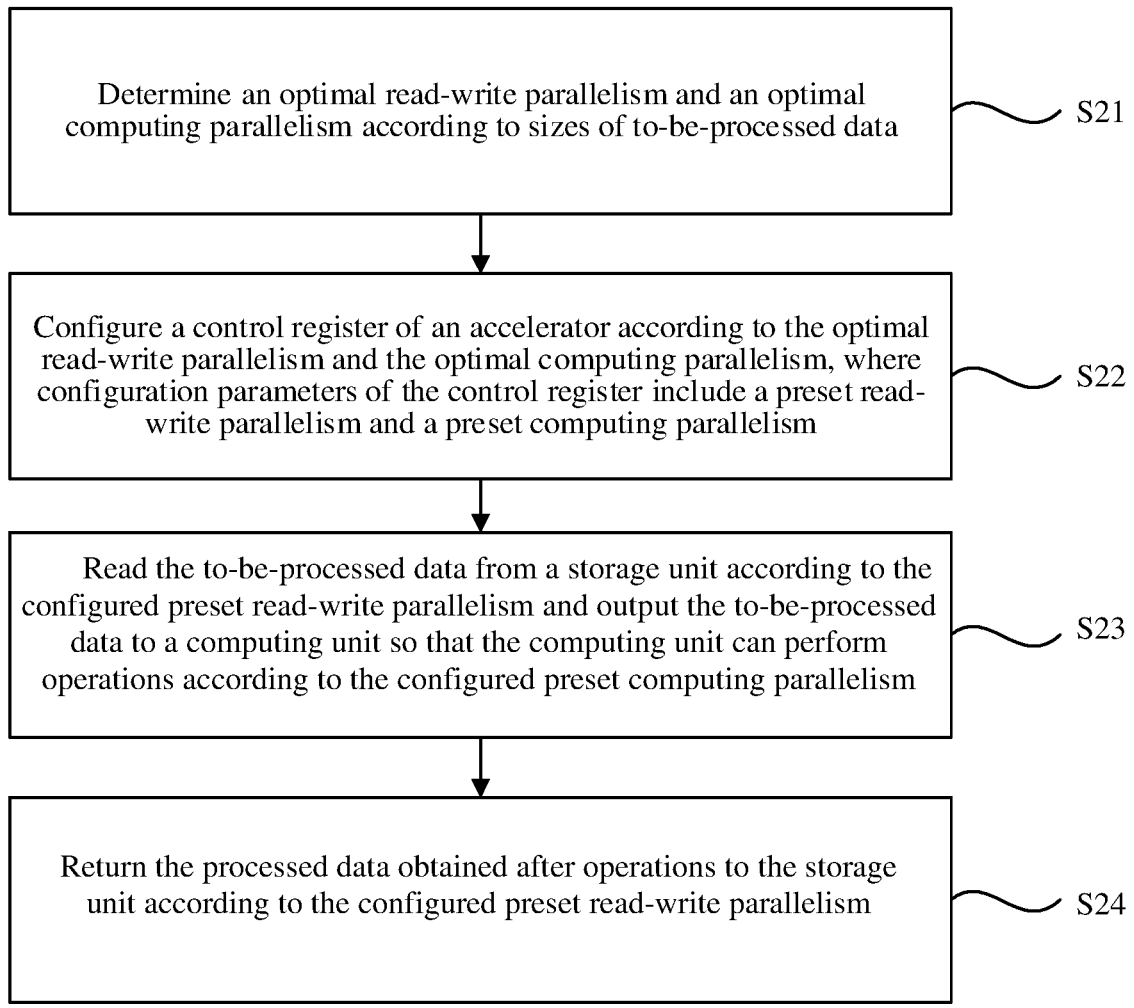
FIG. 2 is a flowchart of a data access method for an accelerator according to Embodiment 2 of the present disclosure.

FIG. 2 is a flowchart of a data access method for an accelerator according to Embodiment 2 of the present disclosure. The embodiment is applicable to increasing a computing resource utilization rate when a GPU processes neural networks. The method may be applied to the data stream architecture-based accelerator according to any embodiment of the present disclosure and has method processes and beneficial effects corresponding to the accelerator. As shown in FIG. 2, the method specifically includes following steps:

S21: Determine an optimal read-write parallelism and an optimal computing parallelism according to sizes of to-be-processed data.

S22: Configure a control register of the accelerator according to the optimal read-write parallelism and the optimal computing parallelism, where configuration parameters of the control register include a preset read-write parallelism and a preset computing parallelism.

S23: Read the to-be-processed data from a storage unit according to the configured preset read-write parallelism and output the to-be-processed data to a computing unit so that the computing unit can perform operations according to the configured preset computing parallelism.

S24: Return the processed data obtained after operations to the storage unit according to the configured preset read-write parallelism.

Optionally, the step of determining an optimal read-write parallelism and an optimal computing parallelism according to sizes of to-be-processed data includes: traverse all settable read-write parallelisms and computing parallelisms and respectively determine corresponding processing time; and determine a read-write parallelism and a computing parallelism corresponding to the shortest processing time as the optimal read-write parallelism and the optimal computing parallelism correspondingly.

Specifically, the optimal read-write parallelism and the optimal computing parallelism can be calculated according to the sizes of the to-be-processed data. Specifically, a traverse manner may be adopted, namely, all the settable read-write parallelisms and computing parallelisms are traversed, needed processing time corresponding to each parallelism setting is assessed so that the read-write parallelism and the computing parallelism corresponding to the shortest processing time can be determined as the optimal read-write parallelism and the optimal computing parallelism correspondingly. After the optimal read-write parallelism and the optimal computing parallelism are acquired, the control register of the accelerator can be configured. Specifically, the optimal read-write parallelism and the optimal computing parallelism may be configured as the preset read-write parallelism and the preset computing parallelism correspondingly so as to be used by the accelerator in a later data read-write process. The configuration parameters of the control register may further include a fetch mode, etc., which can be configured at the same time. After configuration is finished, the to-be-processed data can be read from the storage unit according to the preset read-write parallelism and outputted to the computing unit so that the computing unit can perform operations according to the preset computing parallelism and then return the processed data obtained after operations to the storage unit according to the preset read-write parallelism, where, specific processes of data read-write, operations, etc. can refer to descriptions in the above embodiments, which are not repeated herein.

According to the technical scheme provided by the embodiment of the present disclosure, by using the self-designed accelerator, parallelism parameters needed by the accelerator are automatically determined according to the sizes of the to-be-processed data, thereby performing data access and operations through proper parallelism parameters and further improving data processing efficiency.

Embodiment 3

Figure 3:
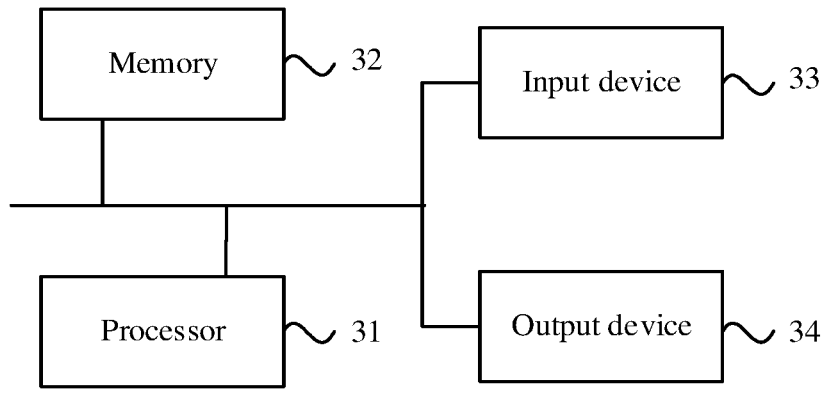
FIG. 3 is a schematic structural diagram of a computer device according to Embodiment 3 of the present disclosure.

FIG. 3 is a structural schematic diagram of a computer device according to Embodiment 3 of the present disclosure, which illustrates a block diagram of an exemplary computer device applicable to realizing an implementation mode of the present disclosure. The computer device shown in FIG. 3 is merely an example, which should not limit functions and application ranges of the embodiment of the present disclosure. As shown in FIG. 3, the computer device includes a processor 31, a memory 32, an input device 33 and an output device 34. One or more processors 31 may be arranged in the computer device. Taking one processor 31 as an example in FIG. 3, the processor 31, the memory 32, the input device 33 and the output device 34 in the computer device may be connected through a bus or other manners, and the bus adopted for connection serves as an example in FIG. 3.

The memory 32 serving as a computer-readable storage medium may be configured to store software programs, computer executable programs and modules, such as program instructions/modules (e.g., a storage unit 11, a read-write address generation unit 12 and a computing unit 13 in a data stream architecture-based accelerator) corresponding to a data access method for the accelerator according to the embodiment of the present disclosure. The processor 31 executes various function applications and data processing of the computer device by operating the software programs, the instructions and the modules stored in the memory 32, thereby realizing the above data access method for the accelerator.

The memory 32 may mainly include a program storage zone and a data storage zone, where, the program storage zone may store an operating system and application programs needed by at least one function; and the data storage zone may store data, etc. established according to usage of the computer device. In addition, the memory 32 may include a high-speed random access memory and may further include a nonvolatile memory, such as at least one disk memory, at least one flash memory or at least one of other nonvolatile solid state memories. In some examples, the memory 32 may further include memories which are remotely set relative to the processor 31 and may be connected to the computer device through networks. The examples of the above networks include but not limited to an Internet, an intranet, a local area network, a mobile communication network and a combination thereof.

The input device 33 may be configured to acquire to-be-processed data and generate key signal input, etc. correlated to user settings and function control of the computer device. The output device 34 may include a display and other devices, which can show processing results, etc. to users.

Embodiment 4

The Embodiment 4 of the present disclosure further provides a storage medium including computer executable instructions. The computer executable instructions are executed by a computer processor to execute a data access method for an accelerator, which includes:
determining an optimal read-write parallelism and an optimal computing parallelism according to sizes of to-be-processed data;
configuring a control register of the accelerator according to the optimal read-write parallelism and the optimal computing parallelism, where configuration parameters of the control register include a preset read-write parallelism and a preset computing parallelism;
reading the to-be-processed data from a storage unit according to the configured preset read-write parallelism and outputting the to-be-processed data to a computing unit so that the computing unit can perform operations according to the configured preset computing parallelism; and
returning processed data obtained after operations to the storage unit according to the configured preset read-write parallelism.

The storage medium may be any type of memory device or storage device. The term "storage medium" aims to include: an installation medium, such as a Compact Disk Read-Only Memory (CD-ROM), a floppy disk or a magnetic tape unit; a computer system memory or a random access memory such as a Dynamic Random Access Memory (DRAM), Double Data Rate Random Access Memory (DDR RAM), a Static Random Access Memory (SRAM), an Extended Data Output Random Access Memory (EDO RAM) and a Rambus Random Access Memory (RAM); a nonvolatile memory such as a flash memory and a magnetic medium (e.g., a hard disk or an optical memory); and a register or other memory elements of similar types, etc. The storage medium may further include other types of memories or a combination thereof. In addition, the storage medium may be located in a computer system where programs are executed, or may be located in a different second computer system connected to the computer system through a network (e.g., Internet). The second computer system may supply program instructions to be executed by a computer. The term "storage medium" may include two or more storage media staying at different positions (e.g., different computer systems connected through networks). The storage medium may store program instructions (e.g., specifically-realized computer programs) executed by one or more processors.

Of course, according to the storage medium including the computer executable instructions according to the embodiment of the present disclosure, the computer executable instructions are not limited to the above method operation, and may further execute related operation in the data access method for the accelerator according to any embodiment of the present disclosure.

A computer-readable signal medium may include data signals propagated in a base band or propagated as a part of a carrier wave, which carries computer-readable program codes. The propagated data signals may have a plurality of forms, and include but not limited to electromagnetic signals, optical signals or any above proper combinations. The computer-readable signal medium may be any computer-readable medium except the computer-readable storage medium. The computer-readable medium may send, propagate or transmit programs used by an instruction executing system, apparatus or device or a combination thereof.

The program codes included by the computer-readable medium may be transmitted by any proper media including but not limited to a wireless manner, a wire, an optical cable, radio frequency (RF), etc., or any above proper combinations.

By describing the implementation modes, those skilled in the art can clearly know that the present disclosure may be realized by software and necessary universal hardware and of course, may also be realized by hardware, but under many circumstances, the former is the better implementation mode. Based on the understanding, the technical scheme of the present disclosure essentially or parts making contribution to the prior art may be embodied in a software product form. A computer software product may be stored in the computer-readable storage medium such as a floppy disk of a computer, a Read-Only Memory (ROM), a Random Access Memory (RAM), a FLASH, a hard disk or a light disk, etc., which includes a plurality of instructions enabling one computer device (a personal computer, a server or a network device, etc.) to execute the method according to various embodiments of the present disclosure.

Note that the above is only a preferred embodiment of the present disclosure and the applied technical principle. Those skilled in the art will understand that the present disclosure is not limited to the specific embodiments described here, and that it is possible for those skilled in the art to make various obvious changes, readjustments and substitutions without departing from the scope of protection of the present disclosure. Therefore, although the present disclosure is described in detail through the above embodiments, the present disclosure is not limited to the above embodiments, and may include other equivalent embodiments without departing from the concept of the present disclosure, and the scope of the present disclosure is determined by the scope of the appended claims.

What is claimed is:

1. A data stream architecture-based accelerator, comprising: a storage unit, a read-write address generation unit and a computing unit, wherein
    the storage unit comprises a plurality of banks;
    the read-write address generation unit is configured to generate storage unit read-write addresses according to a preset read-write parallelism so as to determine target banks in the storage unit according to the storage unit read-write addresses and read to-be-processed data from the target banks for operations in the computing unit; and
    the computing unit comprises a plurality of data paths and is configured to determine target data paths according to a preset computing parallelism so that the target data paths can perform operations on the to-be-processed data to obtain processed data, and then store the processed data into the target banks according to the storage unit read-write addresses.

2. The data stream architecture-based accelerator according to claim 1, wherein the number of the banks is an integral multiple of the preset read-write parallelism.

3. The data stream architecture-based accelerator according to claim 1, wherein the read-write address generation unit is further configured to generate enable signals of the target banks so as to start target bank read-write enable.

4. The data stream architecture-based accelerator according to claim 1, wherein the computing unit is further configured to generate enable signals of the target data paths so as to start target data path enable.

5. The data stream architecture-based accelerator according to claim 1, wherein the preset read-write parallelism comprises a preset read parallelism and a preset write parallelism;
    correspondingly, the storage unit read-write addresses comprise storage unit read addresses and storage unit write addresses, and the target banks comprise target read banks and target write banks;
    the read-write address generation unit is specifically configured to generate the storage unit read addresses according to the preset read parallelism, generate the storage unit write addresses according to the preset write parallelism, determine the target read banks according to the storage unit read addresses, and read the to-be-processed data from the target read banks for operations in the computing unit; and
    the computing unit is specifically configured to use the target data paths to perform the operations on the to-be-processed data to obtain the processed data, and store the processed data into the target write banks according to the storage unit write addresses.

6. The data stream architecture-based accelerator according to claim 5, wherein the preset read parallelism, the preset write parallelism and the preset computing parallelism are the same or partially the same or different from one another.

7. A data access method for an accelerator applied to the data stream architecture-based accelerator according to claim 1, comprising:
    determining an optimal read-write parallelism and an optimal computing parallelism according to sizes of the to-be-processed data;
    configuring a control register of the accelerator according to the optimal read-write parallelism and the optimal computing parallelism, wherein configuration parameters of the control register comprise a preset read-write parallelism and a preset computing parallelism;
    reading the to-be-processed data from the storage unit according to the configured preset read-write parallelism and outputting the to-be-processed data to the computing unit so that the computing unit can perform operations according to the configured preset computing parallelism; and
    returning the processed data obtained after operations to the storage unit according to the configured preset read-write parallelism.

8. The data access method for the accelerator according to claim 7, wherein the step of determining an optimal read-write parallelism and an optimal computing parallelism according to sizes of the to-be-processed data comprises:
- traversing all settable read-write parallelisms and computing parallelisms and respectively determining corresponding processing time; and
- determining a read-write parallelism and a computing parallelism corresponding to a shortest processing time as the optimal read-write parallelism and the optimal computing parallelism correspondingly.

9. A computer device, comprising:
one or more processors; and
a memory configured to store one or more programs, wherein
when the one or more programs are executed by the one or more processors, the one or more processors realize the data access method for the accelerator according to claim 7.

10. A computer-readable storage medium storing computer programs, wherein the programs are executed by a processor to realize the data access method for the accelerator according to claim 7.

* * * * *